(12) United States Patent
Varela

(10) Patent No.: US 6,585,331 B2
(45) Date of Patent: Jul. 1, 2003

(54) TUBULAR AXLE BEAM

(75) Inventor: Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/947,046

(22) Filed: Sep. 6, 2001

(65) Prior Publication Data

US 2003/0042787 A1 Mar. 6, 2003

(51) Int. Cl.[7] .............................................. B60B 35/00
(52) U.S. Cl. .................................... 301/125; 301/124.1
(58) Field of Search ............................. 301/124.1, 125, 301/126, 127, 129, 131, 134; 29/897.2

(56) References Cited

U.S. PATENT DOCUMENTS

| | | | | |
|---|---|---|---|---|
| 925,537 | A | * | 6/1909 | Walbridge ................ 301/124.1 |
| 1,732,825 | A | * | 10/1929 | Wilson, Sr. .................. 295/39 |
| 1,823,158 | A | * | 9/1931 | Mogford et al. ......... 301/124.1 |
| 1,965,267 | A | * | 7/1934 | Storer ..................... 301/124.1 |
| 2,148,714 | A | * | 2/1939 | Urschel ................... 301/124.1 |
| 2,349,373 | A | * | 5/1944 | Pointer ....................... 301/129 |
| 2,611,656 | A | * | 9/1952 | Vanderberg .............. 301/124.1 |
| 2,631,898 | A | * | 3/1953 | Long ........................... 301/127 |
| 2,685,479 | A | * | 8/1954 | Buckendale ............. 301/124.1 |
| 2,718,048 | A | | 9/1955 | Sedgwick |
| 3,804,467 | A | * | 4/1974 | Austermann ................ 301/127 |
| 4,763,957 | A | * | 8/1988 | Poehlmann et al. ..... 301/110.5 |
| 4,880,280 | A | * | 11/1989 | Panzica et al. .......... 301/110.5 |
| 4,915,436 | A | * | 4/1990 | Jaus ............................. 105/1.1 |
| 5,333,775 | A | | 8/1994 | Bruggemann et al. |
| 5,429,423 | A | * | 7/1995 | Pollock et al. ........... 301/124.1 |
| 5,431,326 | A | | 7/1995 | Ni et al. |
| 5,445,001 | A | | 8/1995 | Snavely |
| 5,491,883 | A | | 2/1996 | Marlinga |
| 5,557,961 | A | | 9/1996 | Ni et al. |
| 5,641,176 | A | | 6/1997 | Alatalo |
| 5,673,929 | A | | 10/1997 | Alatalo |
| 5,720,092 | A | | 2/1998 | Ni et al. |
| 5,987,950 | A | | 11/1999 | Horton |
| 6,032,501 | A | | 3/2000 | Bihrer |
| 6,122,948 | A | | 9/2000 | Moses |
| 6,134,931 | A | | 10/2000 | Glaesener |
| 6,138,358 | A | | 10/2000 | Marando |
| 6,447,073 | B1 | * | 9/2002 | Goettker ..................... 301/127 |

OTHER PUBLICATIONS 16.10 Rubber Forming, pp. 481 & 482.

* cited by examiner

Primary Examiner—S. Joseph Morano
Assistant Examiner—Long Bao Nguyen
(74) Attorney, Agent, or Firm—Carlson, Gaskey & Olds

(57) ABSTRACT

A tubular axle beam with variable wall thickness for a vehicle is provided including a first beam portion extending longitudinally between first ends and including spaced apart first longitudinal edges. A second beam portion extends longitudinally between second ends and includes spaced apart second longitudinal edges. Weld beads secure the first longitudinal edges to the second longitudinal edges to define a cavity between the beam portions with the first and second ends arranged adjacent to one another. Preferably, the tubular axle beam is constructed by stamping a first blank to form a first half of the beam, and a second blank is stamped to form a second half of the beam. The first and second portions are welded to one another to define a cavity between the portions. In another embodiment of the invention, a tubular axle beam includes a hollow beam extending longitudinally between opposing ends. A reinforcing sleeve is arranged concentric to the hollow beam between the ends with the reinforcing sleeve secured to the hollow beam, preferably, by weld beads. The hollow beam and reinforcing sleeve initially may be cylindrical tubes that are secured to one another. Subsequently the hollow beam and reinforcing sleeve may be bent into a desired shape and then further formed using a hydroforming or other process to obtain cross-sectional areas of various shapes along the length of the beam.

12 Claims, 3 Drawing Sheets

TUBULAR AXLE BEAM

BACKGROUND OF THE INVENTION

This invention relates to axle beams for vehicles, and more particularly, the invention relates to axle beams suitable for the front axle of a vehicle.

Solid formed or cast axle beams have been used for the front axle of vehicles. The solid axle beams provide a durable structure capable of withstanding the bending and torsional loads to which it is subjected. However, solid axle beams are rather heavy thereby adding weight to the vehicle. Furthermore, there are areas on the axle beam that are subjected to less bending and torsional forces, and therefore, need not be as robust as the rest of the axle beam.

Hollow axle beams have been developed which provide the potential for reducing the weight of the axle beam. Starting from a blank or tube with constant wall thickness, the axle beam may be formed with various cross-sectional shapes to better withstand the bending or torsional forces in a particular area. For example, a hollow torsional beam has been developed using a hydroforming process. However, other processes may be desirable to form a hollow axle beam.

To further control the weight and provide structural integrity which varies with the forces in a particular area of the axle beam, a variable wall-thickness axle beam has been developed. Tubes of various lengths are welded from end to end and then formed into the desired axle beam shape. As a result, the different tubular sections must be aligned properly prior to welding.

Therefore, what is needed is an improved tubular axle beam apparatus and method for forming hollow beams.

SUMMARY OF THE INVENTION

The present invention provides a tubular axle beam with variable wall thickness, for a vehicle including a first beam portion extending longitudinally between first ends and including spaced apart first longitudinal edges. A second beam portion extends longitudinally between second ends and includes spaced apart second longitudinal edges. Weld beads secure the first longitudinal edges to the second longitudinal edges to define a cavity between the beam portions with the first and second ends arranged adjacent to one another. Preferably, the tubular axle beam is constructed by stamping a first blank to form a first half of the beam, and a second blank is stamped to form a second half of the beam. The first and second portions are welded to one another to define a cavity between the portions. The blank with variable wall thickness is tailored to eliminate weight in areas showing low stress.

In another embodiment of the invention, a tubular axle beam includes a hollow beam extending longitudinally between opposing ends. A reinforcing sleeve is arranged concentric to the hollow beam between the ends with the reinforcing sleeve secured to the hollow beam, preferably, by weld beads. The hollow beam and reinforcing sleeve initially may be cylindrical tubes that are secured to one another. Subsequently the hollow beam and reinforcing sleeve may be bent into a desired shape and then further formed using a hydroforming or other process to obtain cross-sectional areas of various shapes along the length of the beam.

Accordingly, the present invention provides an improved tubular axle beam apparatus and method for forming hollow beams.

BRIEF DESCRIPTION OF THE DRAWINGS

Other advantages of the present invention can be understood by reference to the following detailed description when considered in connection with the accompanying drawings wherein.

DETAILED DESCRIPTION OF A PREFERRED EMBODIMENT

Figure 1:
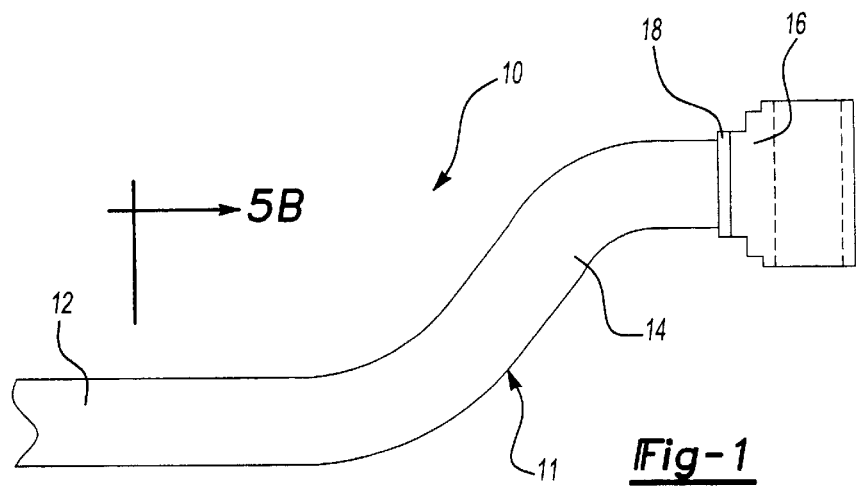
FIG. 1 is a tubular axle beam of the present invention.

A tubular axle beam 10 is shown in FIG. 1 and may be formed using any one of the methods described below. The tubular axle beam 10 includes a hollow beam 11 having a central portion 12 and opposing end portions, only one of which is shown. A king pin boss 16 is secured to each of the end portions 14 by a weld bead 18. A wheel end may be pivotally attached to the king pin boss 16 by king pins. The cross-sectional area of the hollow beam 11 may vary along the length of the tubular axle beam 10 to better withstand the bending and torsional forces in a particular area. For example, the end portion of the beam may have a circular cross-section while the central portion may have a square cross-section.

Figure 2A:
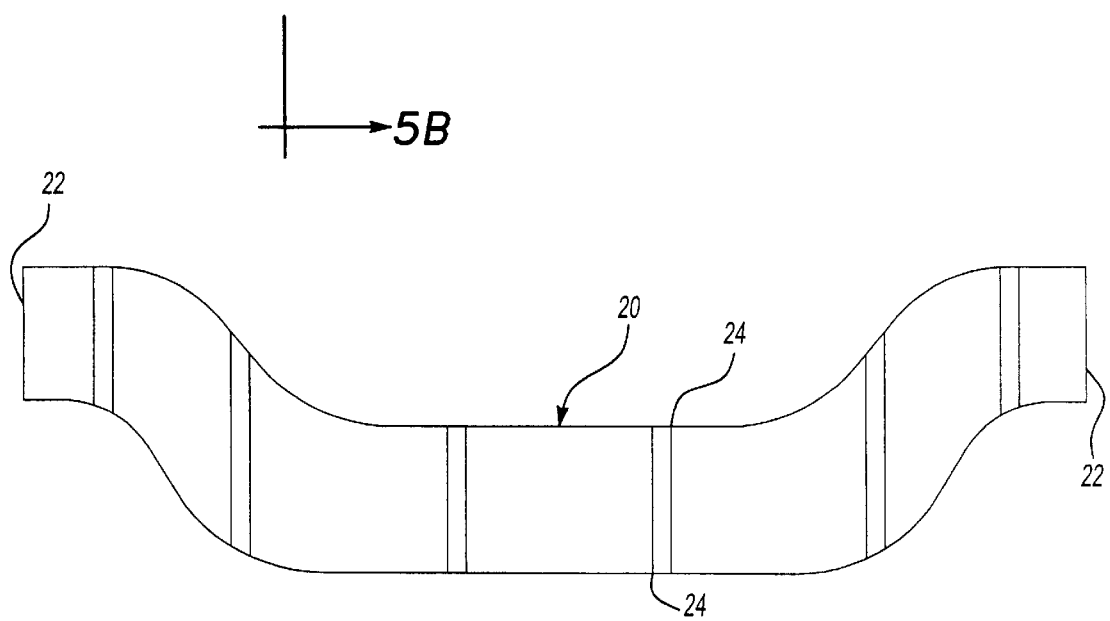
FIG. 2A is a top elevational view of the blank used to construct the tubular beam of the present invention.
Figure 2B:
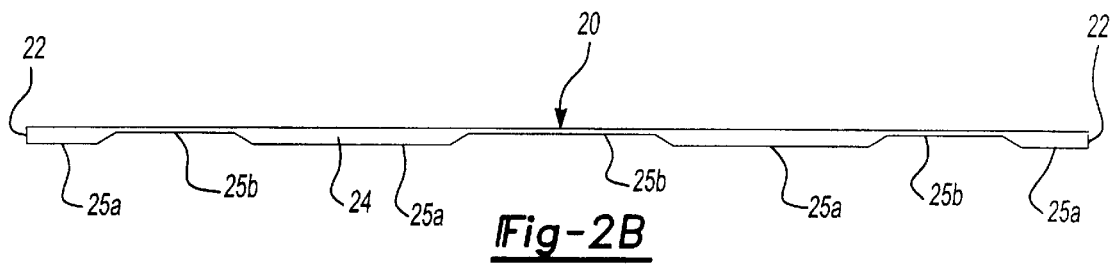
FIG. 2B is a side elevational view of the blank shown in FIG. 2A.
Figure 3:
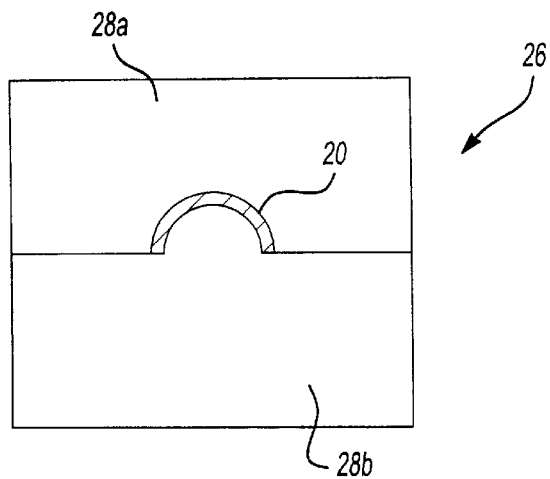
FIG. 3 is a stamping press used to form the blank shown in FIGS. 2A and 2B.
Figure 4:
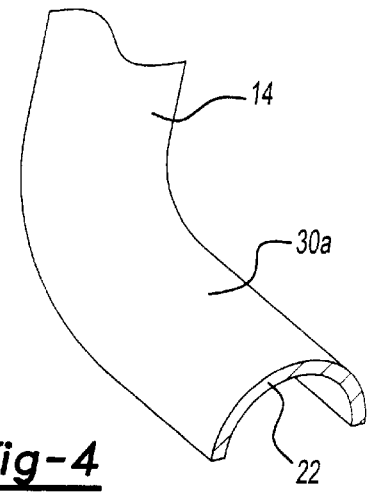
FIG. 4 is a beam portion formed from the blank shown in FIGS. 2A and 2B using the stamping press shown in FIG. 3.

In one embodiment of the present invention, the tubular axle beam 10 may be formed using blanks 20 which are stamped and welded together. Referring to FIGS. 2A and 2B, a blank 20 includes opposing ends 22 and longitudinal edges 24. The thickness of the blank 20 varies along the length to provide the required strength without unnecessary weight. To this end, the blank 20 includes raised portions 25a and recessed portions 25b. One or more blank 20 may be formed by a stamping process and constructed to form the tubular axle beam 10. For example, the blank 20 may be inserted into a stamping press 26, shown in FIG. 3. The stamping press 26 includes the first and second mold halves 28a and 28b that cooperate with one another to produce a beam portion 30a shown in FIG. 4. First and second beam portions 30a and 30b may be secured to one another by weld beads 32 to form the hollow beam 11 having an interior cavity 34.

Figure 5A:
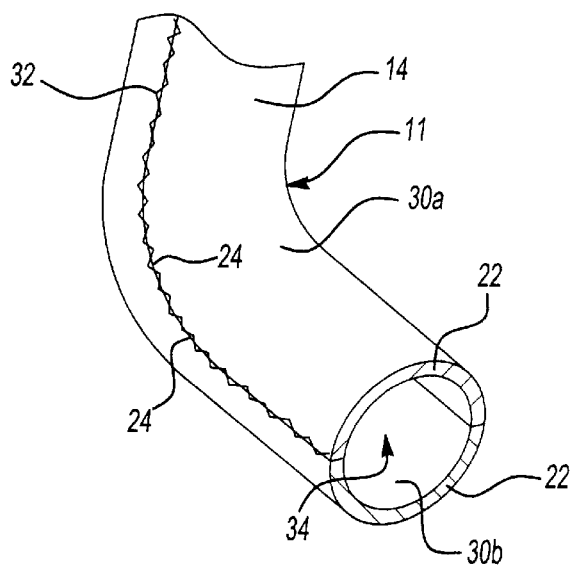
FIG. 5A is a perspective view of first and second beam portions welded together.
Figure 5B:
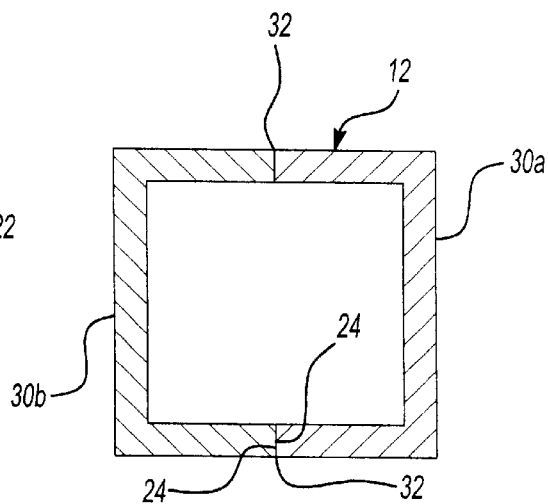
FIG. 5B is a cross-sectional view taken along lines 5B—5B in FIG. 1.

The first and second beam portions 30a and 30b may be mirror images of one another or may have different shapes that when secured together provide a desired cross-section. For example, as shown in FIG. 5A, the end portion 14 has a generally circular cross-section that is formed by two arcuate cross-sections defined by first and second beam portions 30a and 30b. As shown in FIG. 5B, the central portion 12 may have a generally square cross-section that is defined by two U-shaped cross-sections formed by the first and second beam portions 30a and 30b. The square cross-section of the central portion 12 is more suitable for clamping and bending loads while the circular cross-section of the end portions 14 are more suitable for torsional loads. In this manner, a tubular axle beam 10 may be provided using a hollow beam 11 having a cross-section that varies along its length to accommodate torsional and bending forces in a particular area.

Figure 6:
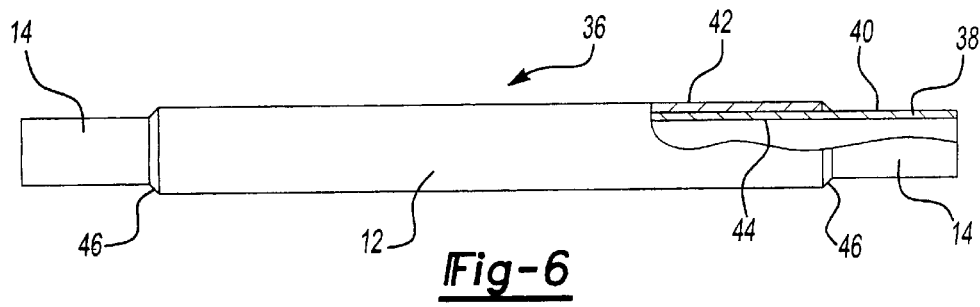
FIG. 6 is a top elevational view of an alternative embodiment of a tubular axle beam of the present invention with an end portion broken away.
Figure 7:
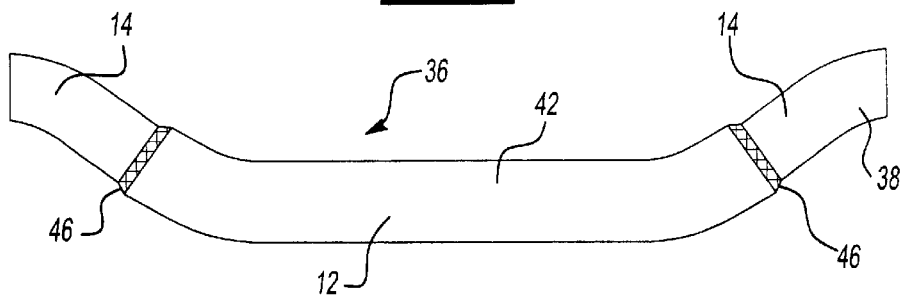
FIG. 7 is a top elevational view of the tubular axle beam shown in FIG. 6 after a bending process.

Another embodiment of the tubular axle beam 36 is shown in FIG. 6. The tubular axle beam 36 includes a hollow beam 38, preferably having a circular cross-section. A reinforcing sleeve 42 is arranged concentric to the hollow beam 38 and is secured thereto such that an outer surface 40 of the hollow beam 38 is in abutting relationship to an inner surface 44 of the reinforcing sleeve 42. Preferably, the reinforcing sleeve 42 is secured to the outer surface 40 of the hollow beam 38 by weld beads 46. The tubular axle beam 36 is then bent into a desired tubular axle beam shape, as shown in FIG. 7. The tubular axle beam 36 may be bent using any suitable process, such as by using mandrels. The tubular axle beam 36 may then be further formed to obtain desired cross-sections along the length of the tubular axle beam 36. One preferred forming process is hydroforming. The tubular axle beam 36 is placed into a mold defining the shape of the outside of the tubular axle beam 36. Fluid is forced into the cavity of the hollow beam 38 under high pressures to force the outer surface of the tubular axle beam into engagement with the mold to obtain the shape defined by the mold surface. In this manner, a reinforced section of the tubular axle beam 36 may be obtained in areas where needed, as shown in FIG. 8, so that additional material and weight is not unnecessarily added to other portions of the tubular axle beam 36.

Figure 8:
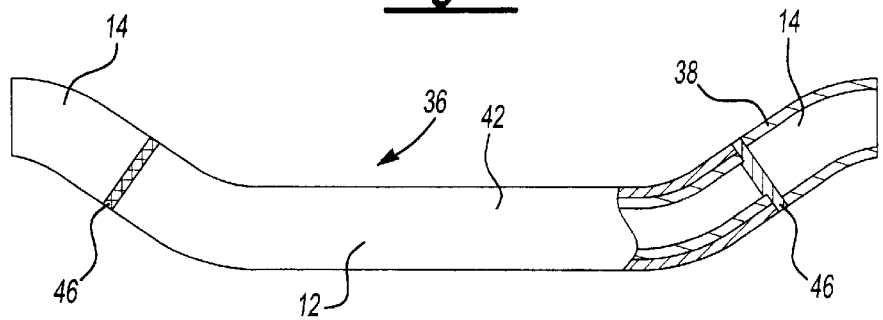
FIG. 8 is a top elevational view of the tubular axle beam shown in FIG. 7 after a hydroforming process with an end portion partially broken away.

As can be seen in FIGS. 6–8, the thickness of the tubular axle beam 36 in the area of the central portion 12 is increased. As a result, the tubular axle beam 36 may be subjected to higher bending forces and torsional forces where the end portion 14 meets the central portion 12.

Figure 9:
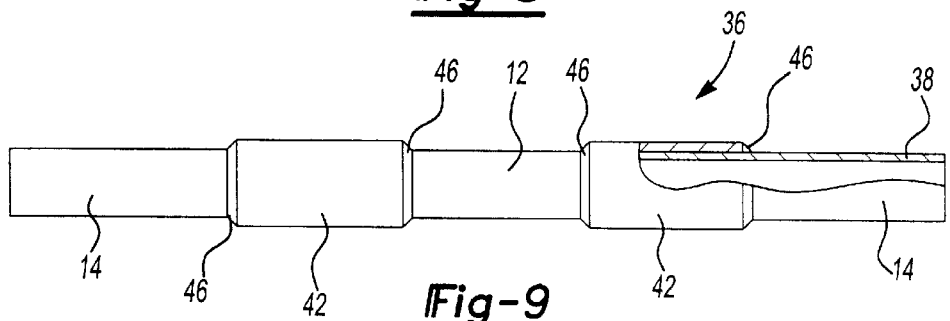
FIG. 9 is another alternative embodiment of the tubular axle beam of the present invention with an end portion partially broken away.
Figure 10:
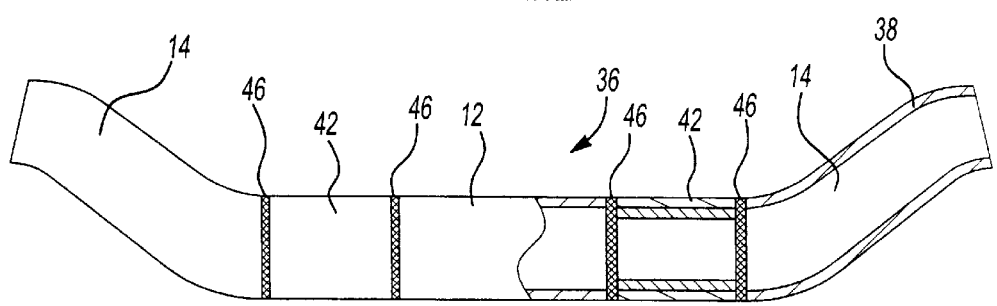
FIG. 10 is a top elevational view of a tubular axle beam shown in FIG. 9 after a bending and hydroforming process with an end portion and central portion partially broken away.

Yet another embodiment of the tubular axle beam 36 is shown in FIGS. 9 and 10. Two reinforcing sleeves 42 are welded to the hollow beam 38. However, it is to be understood that any number of reinforcing sleeves 42 may be used to locally reinforce the tubular axle beam 36 in particular areas as desired. The tubular axle beam 36 may be bent and hydroformed into a desired tubular axle beam shape with a desired cross-sections along the length of the tubular axle beam 36, as shown in FIG. 10.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A tubular axle beam for a vehicle comprising:

a first variable thickness beam portion extending longitudinally between first ends and including spaced apart first longitudinal edges;

a second variable thickness beam portion extending longitudinally between second ends and including spaced apart second longitudinal edges; and weld beads securing said first longitudinal edges to said second longitudinal edges to define a cavity between said beam portions with said first and second ends arranged adjacent to one another.

2. The beam according to claim 1, further including a central portion having a generally square cross-section.

3. The beam according to claim 1, further including opposing end portions having a generally circular cross-section.

4. The beam according to claim 1, further including king pin bosses secured to opposing end portions of said beam.

5. A tubular axle beam for a vehicle comprising:

a hollow beam having a central portion extending longitudinally between ends at an angle to said central portion for supporting king pin portions; and a reinforcing sleeve arranged concentrically with said hollow beam between said ends with said reinforcing sleeve secured to said hollow beam.

6. The beam according to claim 5, wherein said hollow beam includes an outer surface and said reinforcing sleeve includes an inner surface, said surfaces in abutting relationship with one another.

7. The beam according to claim 5, further including a plurality of reinforcing sleeves arranged concentrically with said hollow beam between said ends and secured to said hollow beam.

8. A tubular axle beam for a vehicle comprising:

a hollow beam extending longitudinally between ends;

a reinforcing sleeve arranged concentrically with said hollow beam between said ends with said reinforcing sleeve secured to said hollow beam at least one weld bead securing said reinforcing sleeve to said hollow beam.

9. A tubular axle beam for a vehicle comprising:

a hollow beam extending longitudinally between ends, wherein said hollow beam includes a length with different cross-sectional shapes along said length; and a reinforcing sleeve arranged concentrically with said hollow beam between said ends with said reinforcing sleeve secured to said hollow beam.

10. The beam according to claim 9, wherein said hollow beam includes a central portion and end portions with said central portion having a generally square cross-section.

11. The beam according to claim 10, wherein said end portions have a generally circular cross-section.

12. The beam according to claim 8, further including a plurality of weld beads securing said reinforcing sleeve to said hollow beam.

* * * * *